July 22, 1958 R. M. KROKOS ET AL 2,844,396
HANDLE BAR STEM
Filed Nov. 25, 1955 2 Sheets-Sheet 1
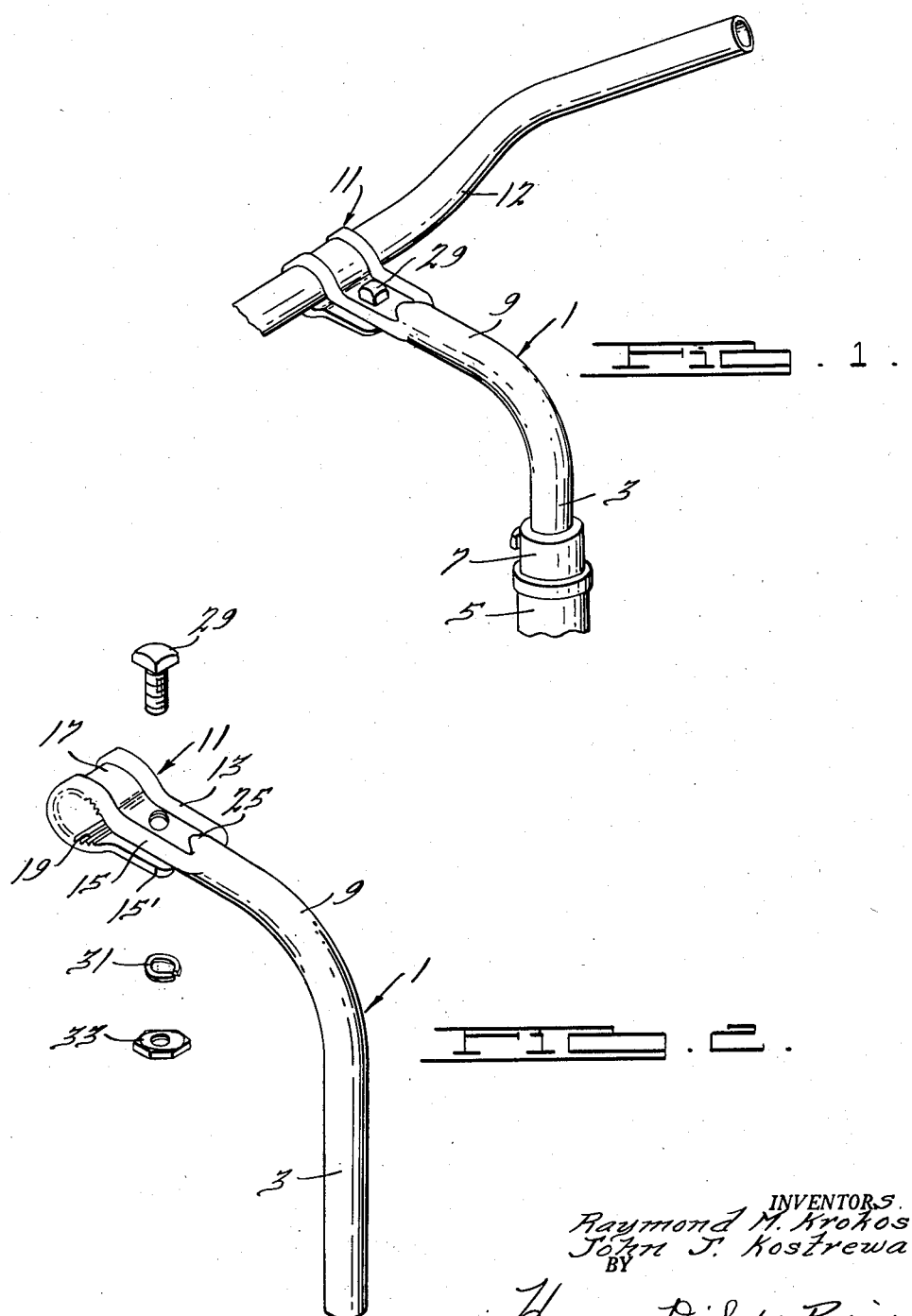
INVENTORS.
Raymond M. Krokos.
John J. Kostrewa.
BY
Harness, Dickey & Pierce.
ATTORNEYS.

July 22, 1958 R. M. KROKOS ET AL 2,844,396
HANDLE BAR STEM
Filed Nov. 25, 1955 2 Sheets-Sheet 2
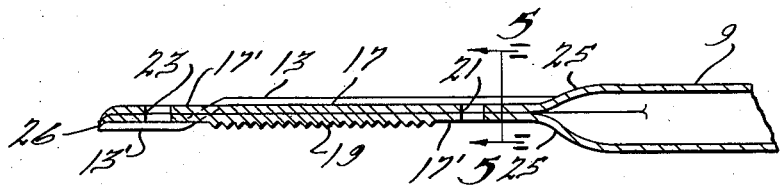
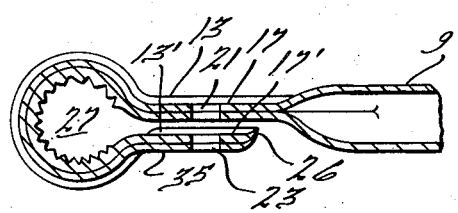
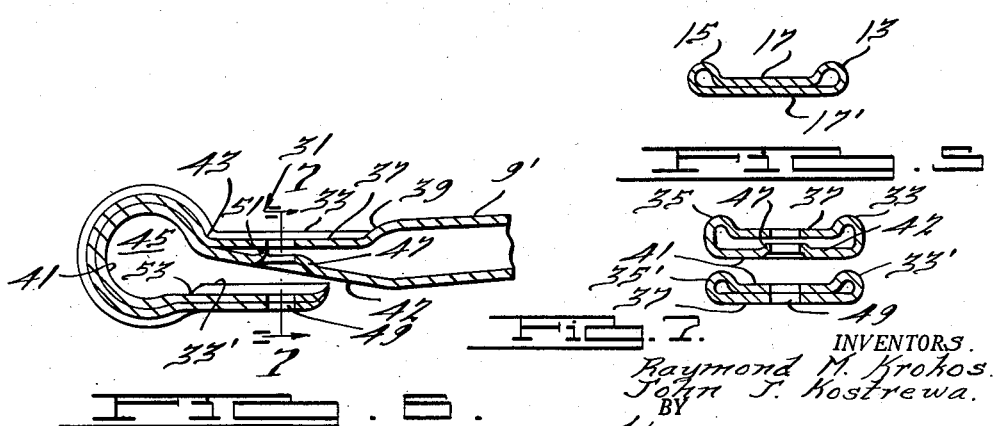
INVENTORS.
Raymond M. Krokos.
John J. Kostrewa.
BY
Harness, Dickey & Pierce.
ATTORNEYS.

United States Patent Office

2,844,396
Patented July 22, 1958

2,844,396

HANDLE BAR STEM

Raymond M. Krokos and John J. Kostrewa, Detroit, Mich., assignors to Evans Products Company, Plymouth, Mich., a corporation of Delaware Application November 25, 1955, Serial No. 548,995

11 Claims. (Cl. 287—54)

Our invention relates to clamping devices and, in particular, to handle bar stems for children's vehicles and toys.

It is the object of our invention to simplify the construction of handle bar stems and to substantially reduce their cost of manufacture.

In accordance with our invention, the handle bar stem is constructed from a singlet piece of ordinary metal tubing. One end of the tubing is formed so that it can be clamped to the handle bar and we do this in such a way that the tubing is not weakened nor are points of stress concentration created. The result is a handle bar stem that is significantly cheaper than those heretofore available but which is just as strong and durable as prior constructions.

Our invention is illustrated in the accompanying drawings in which:

Figure 1 shows the improved handle bar stem in perspective as it would appear in assembly;

Fig. 2 is an exploded perspective view of one embodiment of the improved handle bar stem;

Fig. 3 is a longitudinal cross section of the clamping end of the stem of Fig. 2 prior to bending thereof to form a handle bar receiving aperture;

Fig. 4 is a cross section through the completed handle bar stem clamping aperture;

Fig. 5 is a cross section through a flattened part of the clamping end of the handle bar stem;

Fig. 6 is a cross section similar to Fig. 4 of a modified form of the invention; and Fig. 7 is a cross section along line 7—7 of Fig. 6.

The handle bar stem 1 of this invention is formed from a piece of metal tubing of appropriate wall thickness to withstand the loads that will be applied to it, the outer diameter being preferably, but not necessarily, dictated by the device on which the stem is to be used. As seen best in Figs. 1 and 2, the stem 1 has the usual gooseneck shape with a lower vertical portion 3 that fits within the standard steering post 5 of a velocipede and held in clamped position by a standard locking collar 7. The upper portion 9 of the stem 1 extends in a horizontal direction and at its end carries a clamping section 11 which receives the handle bar 12.

Prior to its being formed into the gooseneck shape, the tubing is flattened at the clamping end 11. This is done in such a way that circular bulbs or ribs 13 and 15 run longitudinally along the side edges of the flattened central portion 17. The bulbs 13 and 15 extend upwardly from the double layer flattened portion 17 and are more or less tangent to the bottom or inside surface 17'. Near the free end, however, of the portion 17, the bulbs 13 and 15 are reversed so that they lie on the opposite side as seen at 13' and 15'. In the course of the flattening operation, the inside surface 17' of the flattened portion is serrated or provided with teeth as shown at 19. Apertures 21 and 23 are also punched in the flattened end during the flattening operation. It is to be particularly noted that the tubing is not flattened in such a way as to cause portion 17 or 17' to commence in a sharp section. Instead, there are conical portions 25 which extend from the original round section of the tubing for a distance into the flat sections 17 and 17' and which are overlapped with the bulbs 13 and 15. This provides a gradually reducing section modulus and eliminates cross sections of substantial stress concentration. The end 26 of the flattened tubing is trimmed and radiused as shown in Fig. 4 to provide a smooth, neat appearance.

The flattened end section is bent into a circular form as seen best in Fig. 4 to provide the aperture 27 for receiving the handle bar 12, the teeth 19 being on the inner periphery of this aperture. In this modification the center of the aperture 27 is shown as located on the axis of the tubing section 9. The holes 21 and 23 are aligned with each other and will receive the locking bolt 29, the head of which will be prevented from rotating by the side bulbs 13 and 15. A lock washer and a nut 31 and 33 respectively, fit onto the bottom of the bolt 29. In order to permit free rotation of the nut 33 the bulbs or ribs 13 and 15 are reversed at 15', as already described, so that they will lie above the bottom surface 35 that will be engaged by the lock washer 31. The bulbs 13' and 15' are spaced a sufficient distance below bottom surface 17' to give proper clamping action.

It will now be seen that when the handle bar 12 is inserted through the aperture 27 and then the bolt 29 and nut 33 tightened together, the diameter of the aperture will be reduced causing the teeth 19 to dig into the material of the handle bar to grip it tightly and thus prevent any undesired movement of the handle bar. Further, if it is desired to change the position of the bar 12, this can be easily done by loosening bolt 29 to permit spring back of the upper and lower clamp sections so that aperture 27 will be enlarged to the point where the bar 12 can be readily adjusted.

In Fig. 6 a modified form of clamping section 31 is shown which possesses somewhat greater strength than the previous embodiment. In this construction, the end of the tubing section 9' is flattened and beaded on its top or outer half in the same manner as before. Thus, there are the beads 33 and 35 on opposite sides of the flat upper or outside layer 37. The change in section modulus between the section 9' and the beaded portion is made gradual by the conical section 39 which corresponds to section 25. The lower or inside layer 41 of the flattened portion is tapered at 42 gradually toward the upper layer, engaging it at about the section 43 at which curvature commences in curving the end of the tubing to form the aperture 45. It may be noted that the center of aperture 45 is located above the axis of the tube section 9' and that the serrations are omitted from its inner handle bar engaging surface. The tapered section 42 has an indentation 47 formed therein in which there is a hole aligned with holes formed in the top and bottom portions to provide the bolt aperture 49. The edge of the hole is extruded up in a sort of tab at 51 until it contacts the bottom of the layer 37 in a force transmitting engagement. On the bottom section the beads 33 and 35 are reversed, as before, at 53 to be located along the edges of the inside layer as shown at 33'.

It will now be appreciated that by our invention we have used ordinary standard tubing, available on the open market, to provide a double layer, split bushing type of clamp for handle bars or the like which provides strength and attractive appearance. We have incorporated features in the clamp end which eliminate areas of great stress concentration and strengthen the end against permanent distortion during usage. With respect to junior vehicles and toys, such as tricycles, in which the I. D. of the steering post 5 is more or less standardized, our design permits us to use tubing that has an O. D. which is the same as the post I. D. It will be understood that modifications can be made in the specific forms of handle bar stem shown herein without departing from the spirit and scope of the invention.

We claim:

1. A single piece handle bar stem constructed of tubing having an end adapted to be received by a steering post and having its other end flattened and reversely bent to form an aperture to receive the handle bar.

2. The invention set forth in claim 1 including ribs formed on one side of the flattened portion for a substantial part of the length thereof but at the free end said ribs are formed on the reverse side of said flattened portion, said free end overlapping a portion of the flattened end inwardly of the handle bar receiving aperture and having an opening in it aligned with an opening in the other flattened portion to receive a bolt whereby the handle bar receiving aperture may be reduced in diameter to securely clamp a handle bar.

3. In a clamping device, a tubular member having a reversely bent end portion comprising crushed layers of tubing in engagement with each other and having an over-all thickness considerably less than the outer diameter of the tubing, said member including a tubular section and an intermediate section of gradually reducing over-all dimension connecting said tubular section to said end portion.

4. In a clamping device, a tubular member having a tubular section and an end section, said end section comprising opposite halves of said member crushed together in a double layer, said double layer having a portion reversely bent to define a clamping aperture, said end section including spaced apart sections at opposite ends of said reversely bent portion, and means for forcing said spaced apart sections toward each other to reduce the size of said aperture.

5. The structure of claim 4 including bulbs in said double layer along the sides thereof and located on the same sides of said spaced apart sections.

6. In a tubular member, a section of tubing having an end portion comprising upper and lower halves, said halves being deformed inwardly together to form a double layer portion with ribs along the side edges thereof and reversely bent to define a clamping aperture, one of said halves tapering toward the other from said tubing section at an angle to said ribs.

7. A single-piece handle bar stem constructed of tubing having an end adapted to be received by a steering post and having its other end flattened, the flattened portion being reversely bent to form a curved portion defining a clamping aperture with a free end portion extending therefrom and overlapping a portion of the tubing, the side edges of said curved portion projecting generally radially outwardly from the convex surface thereof a distance slightly greater than the portions of the convex surface immediately adjacent thereto, said free end portion having the side edges and end thereof bent so as to extend toward the portion of the tubing overlapped thereby and having an opening in it aligned with an opening in the overlapped portion of the tubing to receive a bolt whereby the clamping aperture may be reduced in diameter to securely clamp a handle bar.

8. In a clamping device, a tubular member having a reversely bent end portion comprising crushed layers of tubing in engagement with each other and having an over-all thickness considerably less than the over-all diameter of the tubing, said member including a tubular section and an intermediate section of gradually reducing over-all thickness connecting said tubular section to said end portion, and a bulb of greater over-all dimension than the thickness of said layers formed in said end portion and extending longitudinally thereof.

9. The structure of claim 8 wherein said bulb and said intermediate section overlap.

10. In a member formed of tubing, a tubular section, a deformed section comprising opposite portions of tubing in engagement with each other, a longitudinally extending bulb along said deformed section, said deformed section being joined to said tubular section in a section of gradually increasing width, said bulb overlapping said last mentioned section.

11. In a velocipede or the like having a steering post with an aperture therein, a handle bar stem having one end supported in said aperture, said stem being formed of a single piece of tubing of substantially the same outer diameter as said aperture, the other end of said stem being deformed into a double layer and reversely bent to provide a clamping aperture to receive a handle bar.

References Cited in the file of this patent

UNITED STATES PATENTS

| | | |
|---|---|---|
| 1,902,569 | McDonald | Mar. 21, 1933 |
| 2,357,553 | Schwinn | Sept. 5, 1944 |
| 2,505,648 | Pawsat | Apr. 25, 1950 |
| 2,576,049 | Shott | Nov. 20, 1951 |